United States Patent
Kobayashi et al.

(10) Patent No.: US 11,163,992 B2
(45) Date of Patent: Nov. 2, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Kunihiko Kobayashi, Kanagawa (JP); Shintaro Adachi, Kanagawa (JP); Shigeru Okada, Kanagawa (JP); Akinobu Yamaguchi, Kanagawa (JP); Junichi Shimizu, Kanagawa (JP); Kazuhiro Oya, Kanagawa (JP); Shinya Nakamura, Kanagawa (JP); Akane Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 477 days.

(21) Appl. No.: 16/122,904

(22) Filed: Sep. 6, 2018

(65) Prior Publication Data

US 2019/0325210 A1 Oct. 24, 2019

(30) Foreign Application Priority Data

Apr. 18, 2018 (JP) .............................. JP2018-079719

(51) Int. Cl.
 *G06K 9/00* (2006.01)
 *G06T 7/70* (2017.01)
 (Continued)

(52) U.S. Cl.
 CPC ....... *G06K 9/00442* (2013.01); *G06K 9/2081* (2013.01); *G06K 9/3233* (2013.01);
 (Continued)

(58) Field of Classification Search
 CPC ............. G06K 9/00442; G06K 9/2081; G06K 9/3233; G06K 2209/01; G06T 7/70;
 (Continued)

(56) References Cited

U.S. PATENT DOCUMENTS

| 4,926,490 A | * | 5/1990 | Mano | ................... G06K 9/3283 382/177 |
|---|---|---|---|---|
| 2008/0025606 A1 | * | 1/2008 | Hanano | ................ G06K 9/2063 382/175 |
| 2019/0294912 A1 | * | 9/2019 | Takabayashi | ........ G06K 9/4604 |

FOREIGN PATENT DOCUMENTS

JP 2008040598 2/2008

\* cited by examiner

*Primary Examiner* — Daniel G Mariam
(74) *Attorney, Agent, or Firm* — JCIPRNET (57) ABSTRACT

An information processing apparatus includes a first designation unit, a second designation unit, a position acquisition unit, a memory, and an extraction unit. The first designation unit designates an extensive area from a first read image, the extensive area including an output area and an object area. The second designation unit designates the output area from the designated extensive area. The position acquisition unit acquires positional information regarding the extensive area with respect to the first read image and positional information regarding the output area with respect to the extensive area. The memory stores the positional information regarding the extensive area and the positional information regarding the output area. The extraction unit identifies a position of the extensive area in a second read image in a format identical to a format of the first read image on a basis of the positional information regarding the extensive area stored by the memory. The extraction unit also extracts the output area in the second read image on a basis of the position of the extensive area and the positional information regarding the output area stored by the memory.

13 Claims, 7 Drawing Sheets

(51) Int. Cl.
*G06K 9/32* (2006.01)
*H04N 1/00* (2006.01)
*G06K 9/20* (2006.01)

(52) U.S. Cl.
CPC ........... *G06T 7/70* (2017.01); *H04N 1/00702* (2013.01); *G06K 2209/01* (2013.01); *G06T 2207/10008* (2013.01); *G06T 2207/30176* (2013.01)

(58) Field of Classification Search
CPC . G06T 2207/10008; G06T 2207/30176; G06F 16/93
USPC .................................................. 382/176, 190
See application file for complete search history.

| DOCUMENT ID | ZONE DESIGNATION INFORMATION 1 | | | | ZONE DESIGNATION INFORMATION 2 | | | | ... | ZONE DESIGNATION INFORMATION N | | | |
|---|---|---|---|---|---|---|---|---|---|---|---|---|---|
| | x | y | w | h | SPECIFIED LINE | x | y | w | h | SPECIFIED LINE | x | y | w | h | SPECIFIED LINE |
| 001 | 30 | 60 | 120 | 50 | 4TH LINE | ... | ... | ... | ... | ... | ... | ... | ... | ... | ... |
| ... | ... | ... | ... | ... | ... | ... | ... | ... | ... | ... | ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-079719 filed Apr. 18, 2018.

BACKGROUND

(i) Technical Field

The present disclosure relates to an information processing apparatus and a non-transitory computer readable medium.

(ii) Related Art

In recent years, an information processing apparatus that extracts a target from a reading target such as a document and outputs the target has been proposed (see, for example, Japanese Unexamined Patent Application Publication No. 2008-40598).

The information processing apparatus described in Japanese Unexamined Patent Application Publication No. 2008-40598 includes a scanning unit, a form registration unit, a zone optical character recognition (OCR) unit, an index correction unit, an index unit that provides data acquired by the index correction unit as an index of a document, and a storage unit that stores an image and index data as a document in a document management system.

SUMMARY

Aspects of non-limiting embodiments of the present disclosure relate to an information processing apparatus and a non-transitory computer readable medium.

For example, when multiple documents are read, and when a positional error occurs in any one of the documents, it is not possible to extract a predesignated area from a read image in some cases. Accordingly, it is an object of the present disclosure to provide an information processing apparatus and a non-transitory computer readable medium storing a program that enable an output target to be extracted when multiple documents are read, the extraction being performed without using positional information indicating the position of the output target in a read image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first designation unit, a second designation unit, a position acquisition unit, a memory, and an extraction unit. The first designation unit designates an extensive area from a first read image, the extensive area including an output area and an object area. The second designation unit designates the output area from the designated extensive area. The position acquisition unit acquires positional information regarding the extensive area with respect to the first read image and positional information regarding the output area with respect to the extensive area. The memory stores the positional information regarding the extensive area and the positional information regarding the output area. The extraction unit identifies a position of the extensive area in a second read image in a format identical to a format of the first read image on a basis of the positional information regarding the extensive area stored by the memory. The extraction unit also extracts the output area in the second read image on a basis of the position of the extensive area and the positional information regarding the output area stored by the memory.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the disclosure will be described with reference to the drawings. Note that components having the same functions are denoted by the same reference numerals throughout the drawings, and description thereof is omitted.

SUMMARY OF EXEMPLARY EMBODIMENT

An information processing apparatus according to this exemplary embodiment includes a first designation unit, a second designation unit, a position acquisition unit, a memory, and an extraction unit. The first designation unit designates an extensive area from a first read image, the extensive area including an output area and an object area. The second designation unit designates the output area from the designated extensive area. The position acquisition unit acquires positional information regarding the extensive area with respect to the first read image and positional information regarding the output area with respect to the extensive area. The memory stores the positional information regarding the extensive area and the positional information regarding the output area. The extraction unit identifies a position of the extensive area in a second read image in a format identical to a format of the first read image on a basis of the positional information regarding the extensive area stored by the memory. The extraction unit also extracts the output area in the second read image on a basis of the position of the extensive area and the positional information regarding the output area stored by the memory.

A reading target is not particularly limited and applies to, for example, a document such as a slip, any of various bills, or a receipt. The term "extensive area" is a rectangular area including a rectangular output area including an output target to be output and a rectangular object area including an object other than the output target.

Exemplary Embodiment

Configuration of Information Processing Apparatus

Figure 1:
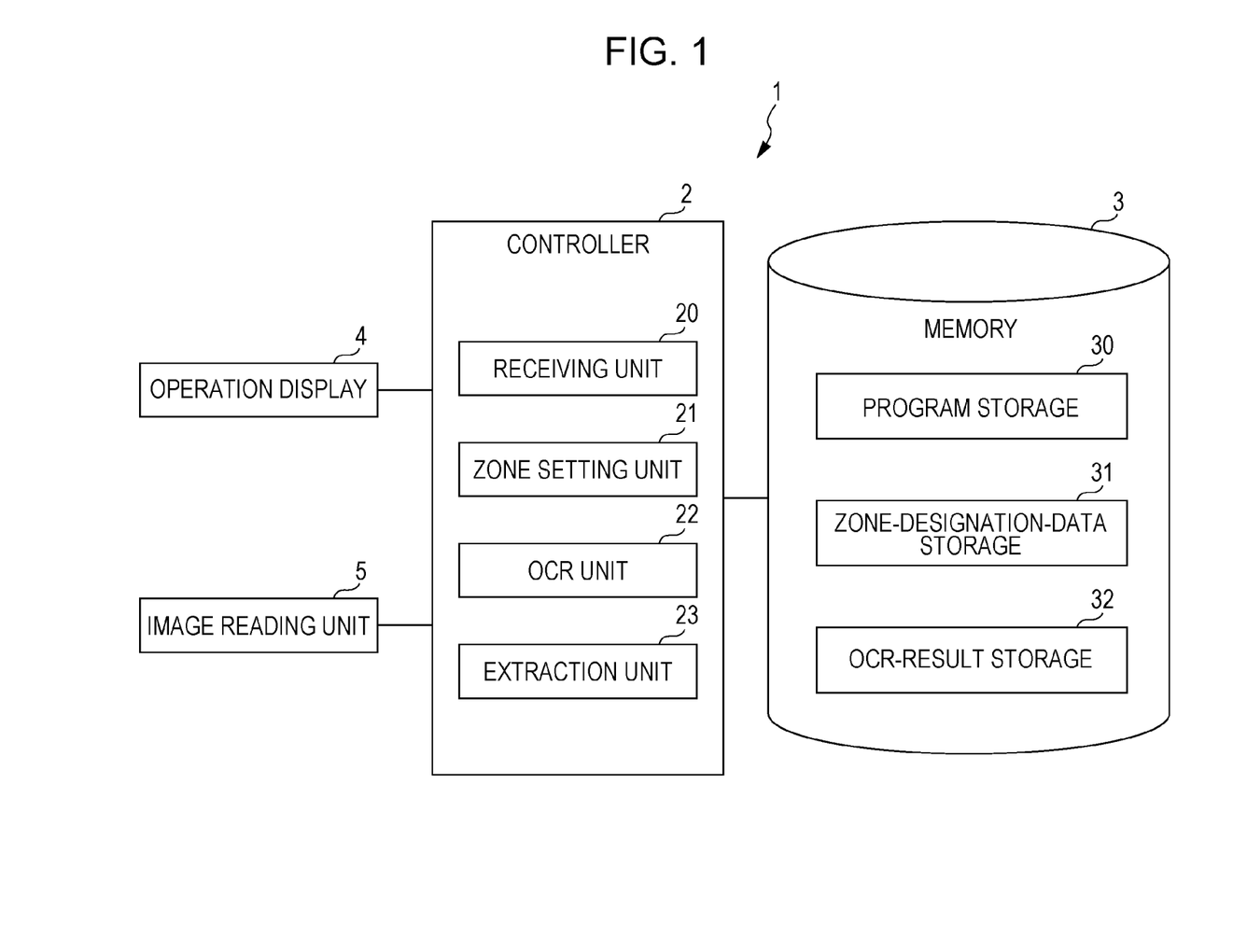
FIG. 1 is a block diagram illustrating an example control system of an information processing apparatus according to the exemplary embodiment.

FIG. 1 is a block diagram illustrating an example control system of an information processing apparatus according to the exemplary embodiment of the disclosure. An information processing apparatus 1 includes, for example, an image forming apparatus, a personal computer, and a multifunctional mobile phone (a smartphone). Hereinafter, the information processing apparatus 1 will be described by taking an image forming apparatus as an example. The image forming apparatus includes, for example, a scanner and a multi-function printer. The information processing apparatus 1 includes a controller 2 that controls components, a memory 3 that stores various pieces of data, an operation display 4 that inputs and displays information, and an image reading unit 5 that optically reads a reading target and forms a read image.

The controller 2 includes a central processing unit (CPU), an interface, and the like. The CPU operates in accordance with a program stored in a program storage 30 of the memory 3 and thereby functions as a receiving unit 20, a zone setting unit 21, an OCR unit 22, an extraction unit 23, or the like. The zone setting unit 21 is an example of a first designation unit, a second designation unit, and a positional information acquisition unit. Details of the receiving unit 20, the zone setting unit 21, the OCR unit 22, and the extraction unit 23 will be described later.

The memory 3 includes the program storage 30, a zone-designation-data storage 31, and an OCR-result storage 32. The program storage 30 is composed of a read only memory (ROM), a random access memory (RAM), a hard disk, or the like and stores programs. The zone-designation-data storage 31 stores zone designation data 310 (see FIG. 2). The OCR-result storage 32 stores an OCR result. The memory 3 is an example of a memory.

The operation display 4 is, for example, a touch panel display and has a configuration in which a touch panel is disposed on a display such as a liquid crystal display by using polymerization.

The image reading unit 5 includes an auto document feeder (ADF or DADF) and a scanner, the auto document feeder being provided on a platen glass. The image reading unit 5 optically reads a reading target placed on the platen glass or a reading target fed by the auto document feeder and forms a read image.

Structure of Zone Designation Data 310

Figure 2:
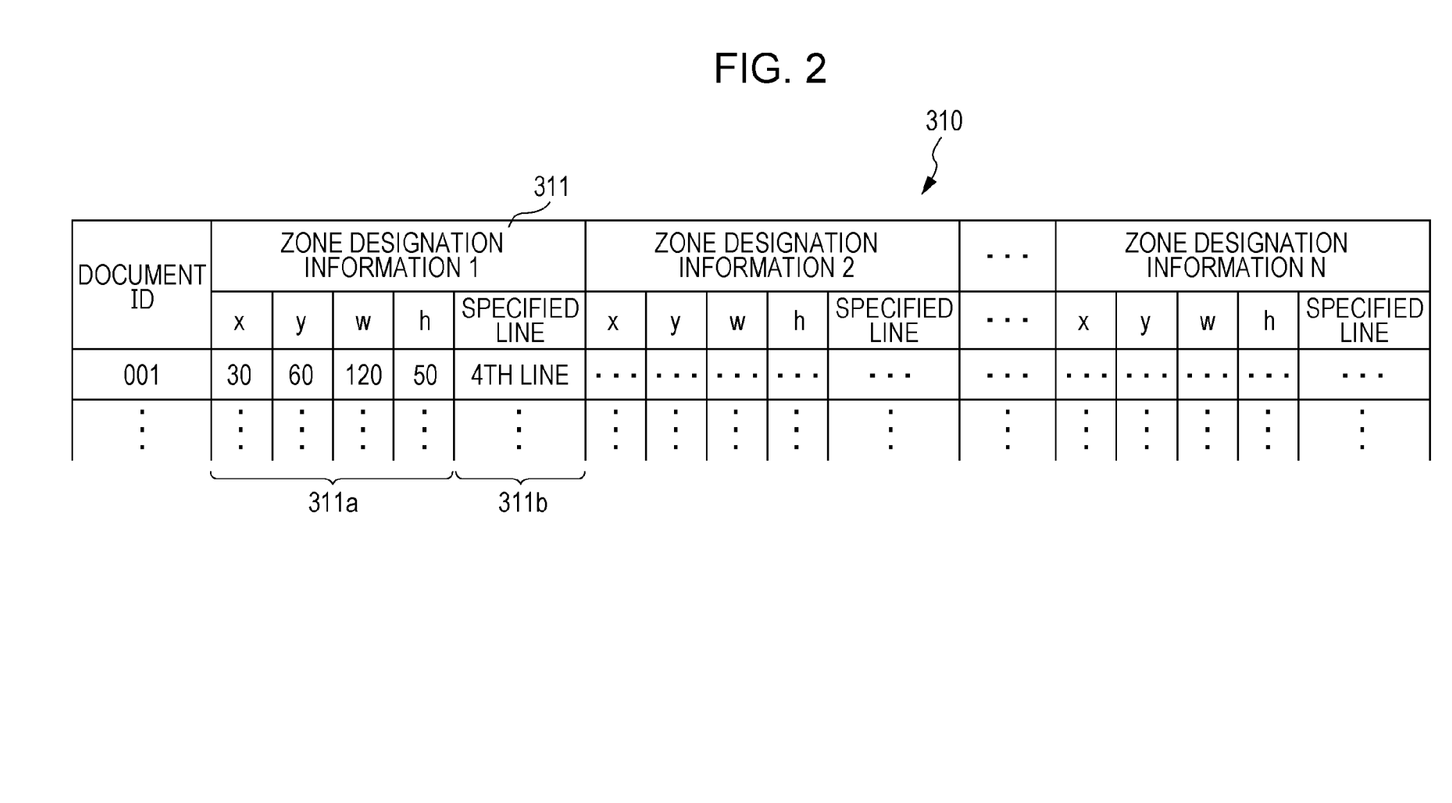
FIG. 2 is a table illustrating an example of zone designation data.

FIG. 2 is a table illustrating an example of the zone designation data 310. As illustrated in FIG. 2, the zone designation data 310 is data in which zone designation information 311 is associated with a document ID. The zone designation information 311 includes area specifying information 311a and positional information. The area specifying information 311a indicates the position and the size of a rectangular area (hereinafter, also referred to as an extensive area) including an output area including a target to be output (hereinafter, also referred to as an output target) and an object area including an object other than the output target. The positional information indicates the position of the output target in the extensive area.

The term "object" denotes a component of an image, the component including information regarding a character, character string, a symbol, a figure, a table (including a title), and combination of these. The positional information regarding the output target in the extensive area includes information 311b (hereinafter, also referred to as specified line information 311b) indicating, for example, the line corresponding to the location of the output target in the extensive area (hereinafter, also referred to as a specified line). The specified line information 311b is an example of positional information. The positional information is an example of attribute information of the output target. The document ID is information indicating a document that is a reading target.

The area specifying information 311a includes, for example, coordinate values (x, y) of one of four vertexes of the extensive area, that is, information indicating a position x of the vertex from a first end (for example, the left end) of a read image, information indicating a position y from a second end (for example, the upper end) adjacent to the first end, information indicating a width w of a zone, and information indicating a height h of the zone. Note that for the positions x and y, the width w, and the height h, actual distances (for example, a unit of mm) or pixel values of the read image may be used.

The specified line information 311b may be set by using, for example, a format for specifying one line (such as n-th line) or multiple lines (such as m-th line to n-th line).

Zone

Figure 3:
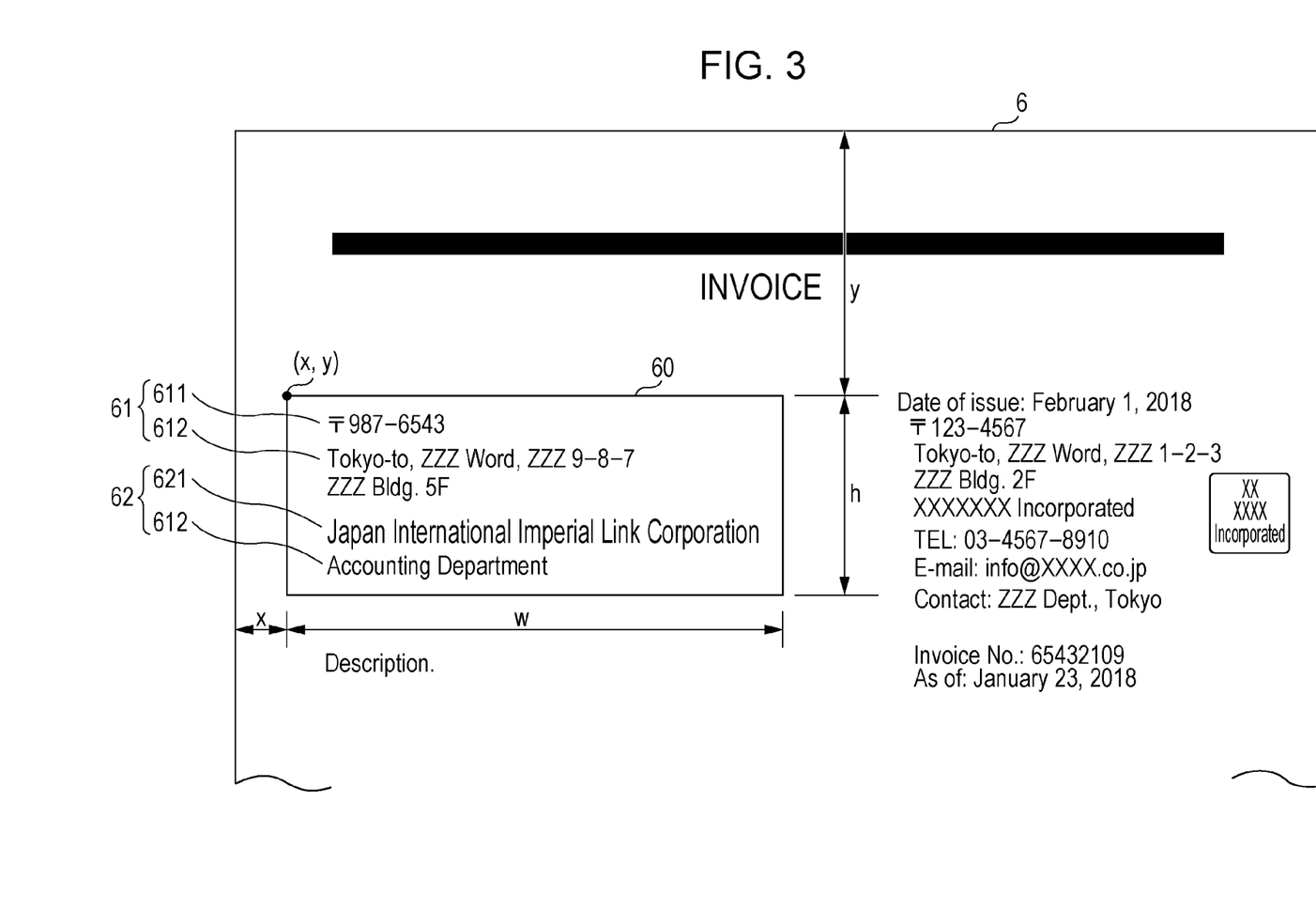
FIG. 3 is a view illustrating an example of a zone.

A zone will be described. FIG. 3 is a view illustrating an example of the zone. The zone is set on the basis of an extensive area 60 including an output target and the position of the output target in the extensive area 60. Hereinafter, a zone set in an invoice image 6 resulting from reading an invoice that is an example of a reading target will be described taken as an example. Note that the invoice image 6 is a sample image for designating an extensive area (an output area and an object area). That is, the invoice image 6 is an example of a first read image.

As illustrated in FIG. 3, the extensive area 60 is a rectangular area including a specific target in the invoice image 6 and a marginal area around the specific target. In the example illustrated in FIG. 3, the extensive area 60 includes destination information 61, addressee information 62, and a specific marginal area around the destination information 61 and the addressee information 62. The destination information 61 includes postcode information 611 and address information 612, and the addressee information 62 includes company name information 621 and department name information 622, for example, each of which serves as a specific target. The extensive area 60 includes an output target.

The position of the output target in the invoice image 6 is set by the specified line information 311b. Specifically, in the example illustrated in FIG. 3, for example, when a company name is the output target, "Fourth line" may be set as the specified line information 311b. For example, when an address is the output target, "First line to third line" that describe the address may be set as the specified line information 311b.

Configuration of Controller 2

The receiving unit 20, the zone setting unit 21, the OCR unit 22, and the extraction unit 23 that are included in the controller 2 will be described. The receiving unit 20 receives an operation performed by an operator on the operation display 4. The receiving unit 20 also receives a read image formed by the image reading unit 5 by reading the reading target.

The zone setting unit 21 sets the zone designation information 311 in accordance with the operation by the operator received by the receiving unit 20. Specifically, the zone setting unit 21 sets the area specifying information 311a for an extensive area and the specified line information 311b in accordance with the operation by the operator. The zone setting unit 21 also records the set zone designation information 311 as the zone designation data 310 in the zone-designation-data storage 31 of the memory 3.

Note that the zone setting unit 21 may set the zone designation information 311 for each reading target. In addition, multiple pieces of zone designation information 311 may be set for one reading target.

The OCR unit 22 performs an OCR process on the read image received by the receiving unit 20 and thereby acquires an OCR result. The OCR result includes, for example, information regarding the content of a character or a character string and information regarding the position of the character or the character string. The OCR unit 22 also stores the acquired OCR result in the OCR-result storage 32 of the memory 3.

From the read image received by the receiving unit 20, the extraction unit 23 extracts the extensive area set by the zone setting unit 21 for the reading target. Specifically, the extraction unit 23 acquires the zone designation information 311 in the zone designation data 310 stored in the zone-designation-data storage 31 of the memory 3 and acquires an OCR result corresponding to the extensive area from the OCR-result storage 32 of the memory 3 on the basis of the acquired zone designation information 311. The extraction unit 23 also acquires an OCR result corresponding to a specified line from the acquired OCR result corresponding to the extensive area and extracts, as an output target, the OCR result corresponding to the specified line.

Figure 4:
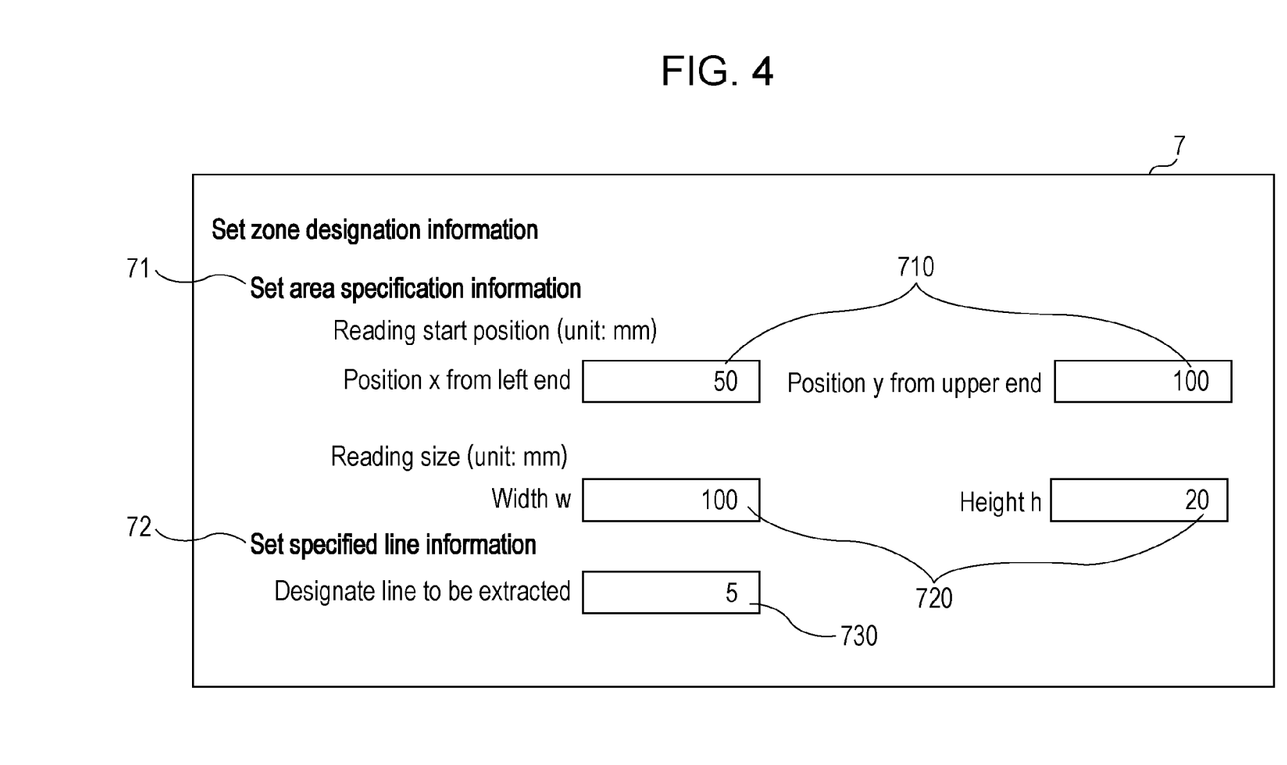
FIG. 4 is a view illustrating an example of a setting screen for setting zone designation information.

A screen for setting zone designation information will be described with reference to FIG. 4. FIG. 4 is a view illustrating an example of the setting screen for setting zone designation information. As illustrated in FIG. 4, a setting screen 7 includes a first partial screen 71 for setting the area specifying information 311a and a second partial screen 72 for setting the specified line information 311b.

The first partial screen 71 includes a first input field 710 for inputting the positions of the extensive area 60 in the read image, that is, the position x from the left end and the position y from the upper end that are described above and a second input field 720 for inputting the width w and the height h of the extensive area 60. The second partial screen 72 includes a third input field 730 for inputting designation of a line to be extracted, that is, information regarding the line corresponding to the location of the output target in the extensive area 60 set by using the first partial screen 71.

The information input by the operator on the setting screen 7 is stored in the zone-designation-data storage 31 of the memory 3.

Note that how to set the extensive area 60 and set the position of the output target in the extensive area 60 is not limited to the method for inputting coordinate values on the setting screen 7 illustrated in FIG. 4. For example, the extensive area 60 and the position of the output target in the extensive area 60 may be set through an operation performed on the screen (hereinafter, also referred to as a "user interface (UI) screen") including the read image displayed on the operation display 4.

The operation performed on the UI screen includes, for example, an operation for selecting specific points of the extensive area 60 (for example, two points of the extensive area 60, that is, the coordinates of the upper left vertex and the coordinates of the lower right vertex) by touching the operation display 4 with a finger (hereinafter, also referred to as a "touch"), an operation for designating the frame of the extensive area 60 by sliding a finger on the operation display 4, and an operation for performing a touch on a line indicating the output target (multiple lines, if any).

Operations of Exemplary Embodiment

Figure 5:
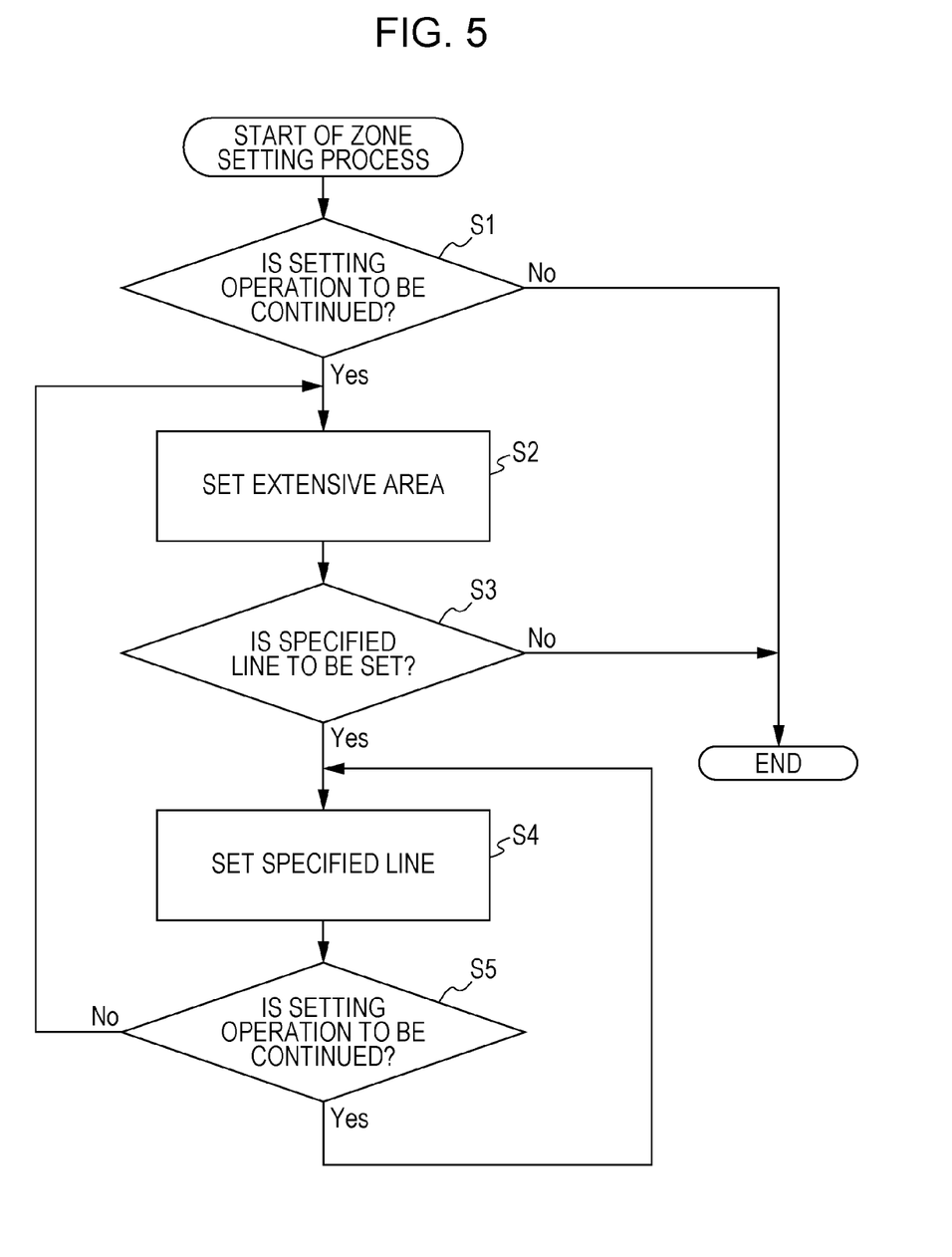
FIG. 5 is a flowchart illustrating an example of operations of a process for setting the zone designation information for the information processing apparatus according to this exemplary embodiment.
Figure 6:
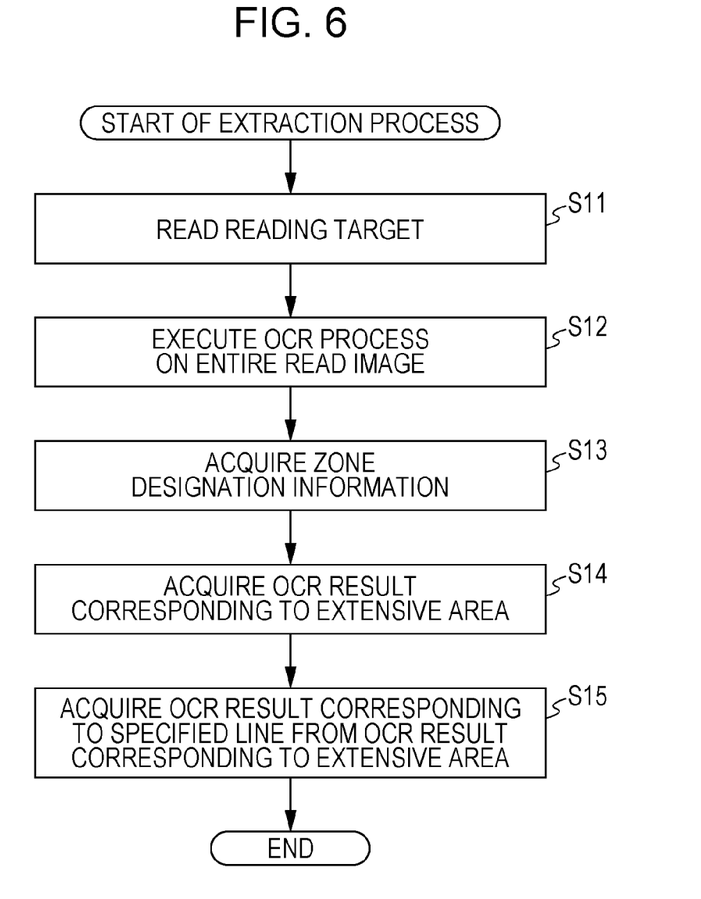
FIG. 6 is a flowchart illustrating an example of operations of a process for extracting an output target for the information processing apparatus according to this exemplary embodiment.

An example of operations of the information processing apparatus 1 according to the exemplary embodiment of the disclosure will be described with reference to FIGS. 5 and 6. FIG. 5 is a flowchart illustrating an example of operations of a process for setting zone designation information (hereinafter, also referred to as a "zone setting process"). FIG. 6 is a flowchart illustrating an example of operations in a process for extracting an output target (hereinafter, also referred to as an "extraction process") for the information processing apparatus according to this exemplary embodiment. Note that the setting of the zone designation information illustrated in FIG. 5 is performed on a read image (first read image) serving as a sample as described above. The extraction process illustrated in FIG. 6 is executed on multiple read images in the same format as that of the first read image. Each read image in the same format as that of the first read image is an example of a second read image.

(1) Zone Setting Process

If an operation for setting the zone designation information 311 performed by the operator on the operation display 4 is to be continued (S1: Yes), the zone setting unit 21 sets an extensive area in accordance with the operation (S2).

If the set extensive area includes multiple lines, that is, if the specified line information 311b for an output target needs to be set (S3: Yes), the zone setting unit 21 sets the specified line information 311b in accordance with an operation by the operator (S4).

If another operation for setting the zone designation information 311 is to be continued, that is, if the operation for setting a zone performed by the operator is to be continued (S5: Yes), step S2 and following steps are performed. The phrase "if an operation for setting the zone designation information 311 is to be continued" applies to, for example, a case where multiple zones are to be set in one reading target.

(2) Extraction Process

The image reading unit 5 reads a reading target fed by the auto document feeder (S11), forms a read image according to the reading target, and transmits the read image to the controller 2. The receiving unit 20 receives the read image.

The OCR unit 22 executes the OCR process on the entire read image received by the receiving unit 20 (S12) and acquires an OCR result. The OCR unit 22 stores the OCR result in the OCR-result storage 32 of the memory 3.

The extraction unit 23 acquires the zone designation information 311 in the zone designation data 310 stored in the zone-designation-data storage 31 of the memory 3 (S13). The extraction unit 23 acquires an OCR result corresponding to the extensive area on the basis of the zone designation information 311 (S14). That is, the extraction unit 23 extracts the extensive area.

The extraction unit 23 acquires an OCR result corresponding to the specified line from the acquired OCR result corresponding to the extensive area (S15) and extracts the OCR result as an output target.

Note that multiple zones (for example, N zones) are set in one reading target, and steps S14 and S15 described above are performed for each zone.

When multiple (for example, 100 or more) documents are read in series, and, for example, even though the reading position of the reading target is displaced due to the performance of the auto document feeder, the arrangement in the reading target, or other factors, the configuration described above enables the output target to be extracted without using the positional information indicating the position of the output target in the read image.

Modification 1

In the above-described exemplary embodiment, the positional information regarding the output target in the extensive area, specifically, the specified line information 311b indicating the line corresponding to the location of the output target in the extensive area is used as the attribute information of the output target. However, the attribute information is not limited to this. For example, information, such as a common character string that is common to the extensive area, indicating a specific component identifying an output target may be used as the attribute information of the output target.

The information regarding a specific component includes information regarding, for example, common content of the output target, a common attribute of the output target character, or a common number of characters. The information indicating the content of the output target includes, for example, information regarding a character (hereinafter, also referred to as character information) and information regarding a symbol (hereinafter, also referred to as symbol information).

The character information includes information indicating a specific keyword such as Japanese words "to", "do", "fu", "ken" (prefecture), "shi" (city), "machi" (town), "mura" (village), "cho", "ban", and "go" for identifying an address that is an example of the content of an output target and "Incorporated" for identifying a company name that is an example of the content of the output target.

The symbol information includes information indicating a Japanese postcode mark representing a postcode for identifying an address that is an example of the content of the output target, a symbol for Yen for identifying an amount that is an example of the content of the output target, a symbol for Inc. for identifying a company name that is an example of the content of the output target, and other symbols.

The extraction unit 23 further extracts an output target from the extensive area 60 in accordance with the above-described information indicating the content of the output target.

The method by which a line is specified by using the information indicating a keyword or the symbol information is effective particularly when multiple lines are set as the specified lines. For example, in the example illustrated in FIG. 3, suppose a case where the output target is an address, "First line to third line" is set as the specified line information 311b but the address is described in two lines. In this case, to find that the third line represents information different from the address, the information indicating a keyword or the symbol information may be used. Specifically, suppose a case where the third line includes the keyword "Corporation". Even though "First line to third line" is set in advance as an address as described above, it may be determined that the third line is not the information indicating an address, and thus the third line may be excluded from the output target. Note that this process may be executed by the extraction unit 23.

The extraction unit 23 may also extract the output target on the basis of the attribute of a character or the number of characters. For example, when determining that a character is a numeral as the attribute of the character, the extraction unit 23 may extract information indicating an amount or a postcode for the character. The extraction unit 23 may also specify the type of the output target on the basis of the number of characters.

Modification 2

Figure 7:
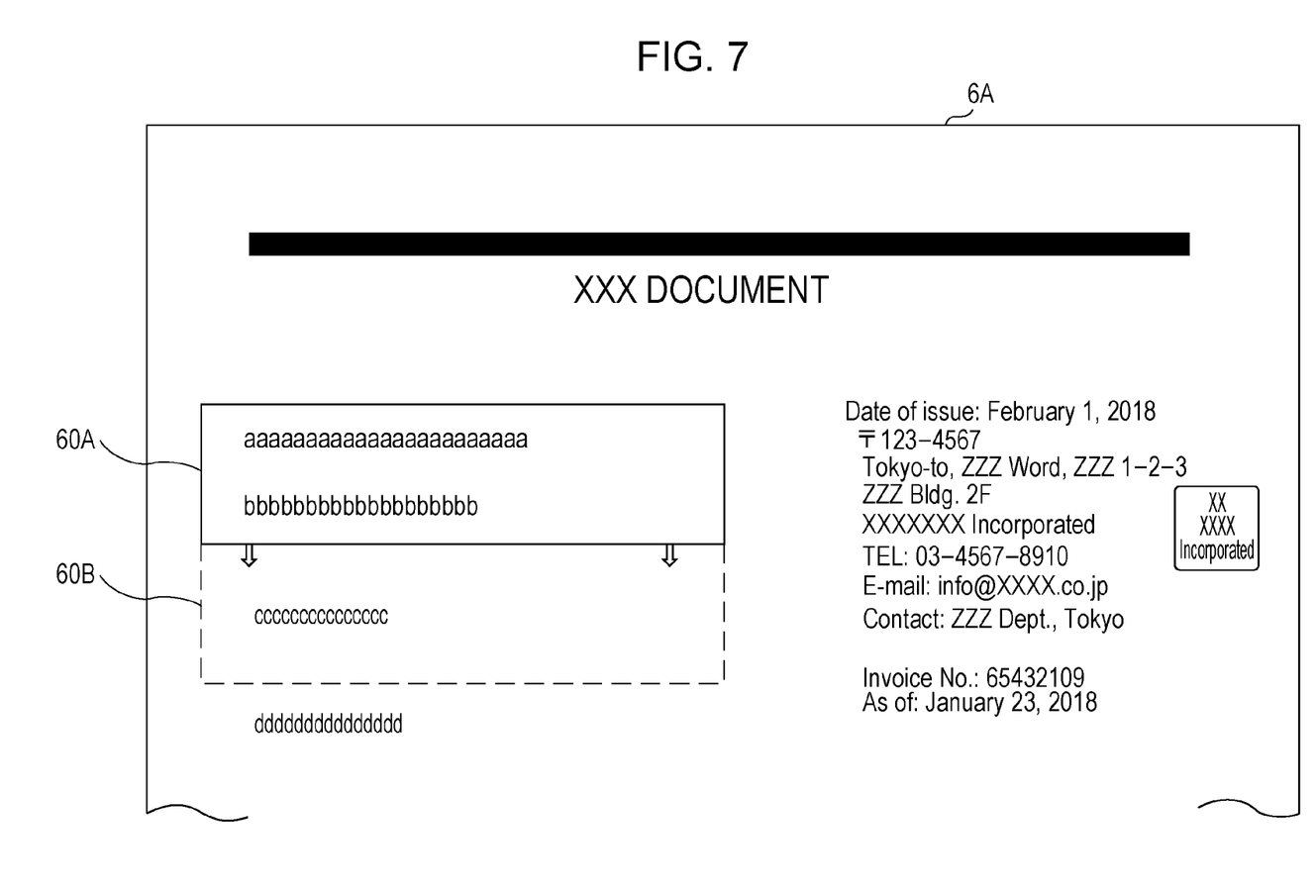
FIG. 7 is a view illustrating an example of extending an extensive area.

FIG. 7 is a view illustrating an example of extending the extensive area 60. With reference to FIG. 7, a document image 6A resulting from reading a document as a reading target will be described taken as an example. If an extensive area does not include a line corresponding to an output target, the extraction unit 23 extends the extensive area in a predetermined direction and extracts a new extensive area.

Specifically, if the number of lines included in an extensive area 60A extracted by the extraction unit 23 is smaller than the number of lines related to a specified line, the extraction unit 23 extracts a new extensive area 60B extended to include the specified line.

A case where "Third line" is set as the specified line information 311b will be described taken as an example. As illustrated in FIG. 7, when the number of lines included in the extensive area 60A extracted by the extraction unit 23 is smaller than 3, the new extensive area 60B extended to include the third line that is the specified line is extracted (see the arrow in FIG. 7).

Although the exemplary embodiment according to the disclosure has heretofore been described, the exemplary embodiment of the disclosure is not limited to the exemplary embodiment described above. Various modifications and implementations may be made without departing from the spirit of the disclosure. For example, the configuration in which the information processing apparatus 1 includes the image reading unit 5 has been described taken as an example in the exemplary embodiment. However, the image reading unit 5 does not have to be necessarily provided, and the information processing apparatus 1 may receive and process a read image read by an external apparatus.

For example, the OCR process is executed on the entire read image in the exemplary embodiment described above. However, the OCR process target is not limited to this. The OCR process may be executed on only the extensive area extracted by the extraction unit 23. Although the example in which the line is specified on the assumption that the reading target is written from left to right has been described in the exemplary embodiment, specifying a line in the reading target written from top to bottom is also included in the scope of the disclosure.

At least one or all of the components of the controller 2 may also be configured by a hardware circuit such as a field programmable gate array (FPGA) or an application specific integrated circuit (ASIC).

Part of elements of the exemplary embodiment described above may be omitted or modified without departing from the spirit of the disclosure. In addition, without departing from the spirit of the disclosure, steps may be added, deleted, and modified in the flow of the processing in the exemplary embodiment, and the order of the steps may also be changed. A program used in the exemplary embodiment may be provided in such a manner as to be recorded in a recording medium such as a compact disk read only memory (CD-ROM). The program may be stored in an external server such as a cloud server and may be used through a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   designate an extensive area from a first read image, the extensive area including an output area and an object area;
   designate the output area from the designated extensive area;
   acquire positional information regarding the extensive area with respect to the first read image and positional information regarding the output area with respect to the extensive area;
   a memory that stores the positional information regarding the extensive area and the positional information regarding the output area;
   the processor further configured to identify a position of the extensive area in a second read image in a format identical to a format of the first read image on a basis of the positional information regarding the extensive area stored by the memory and extract the output area in the second read image on a basis of the position of the extensive area and the positional information regarding the output area stored by the memory.

2. The information processing apparatus according to claim 1,
   wherein the processor further configured to extract the output area as the positional information regarding the output area on a basis of specified line information indicating a line corresponding to a location of the output area in the extensive area.

3. The information processing apparatus according to claim 2,
   wherein if the extensive area does not include the line corresponding to the output area, the processor further configured to extend the extensive area in a predetermined direction and extract a new extensive area.

4. The information processing apparatus according to claim 3,
   wherein the processor further configured to designate the output area as a line including a common character string.

5. The information processing apparatus according to claim 4,
   wherein if the extensive area does not include the common character string corresponding to the output area, the processor further configured to extend the extensive area in a predetermined direction and extract a new extensive area.

6. The information processing apparatus according to claim 2,
   wherein the processor further configured to designate the output area as a line including a common character string.

7. The information processing apparatus according to claim 6,
   wherein if the extensive area does not include the common character string corresponding to the output area, the processor further configured to extend the extensive area in a predetermined direction and extract a new extensive area.

8. The information processing apparatus according to claim 1,
   wherein if the extensive area does not include the line corresponding to the output area, the processor further configured to extend the extensive area in a predetermined direction and extract a new extensive area.

9. The information processing apparatus according to claim 8,
   wherein the processor further configured to designate the output area as a line including a common character string.

10. The information processing apparatus according to claim 9,
    wherein if the extensive area does not include the common character string corresponding to the output area, the processor further configured to extend the extensive area in a predetermined direction and extract a new extensive area.

11. The information processing apparatus according to claim 1,
    wherein the processor further configured to designate the output area as a line including a common character string.

12. The information processing apparatus according to claim 11,
    wherein if the extensive area does not include the common character string corresponding to the output area, the processor further configured to extend the extensive area in a predetermined direction and extract a new extensive area.

13. A non-transitory computer readable medium storing a program causing a computer to execute a process, the computer including a memory that stores positional information regarding an extensive area and positional information regarding an output area, the extensive area including the output area and an object area, the process comprising:
    designating the extensive area from a first read image;
    designating the output area from the designated extensive area;
    acquiring the positional information regarding the extensive area with respect to the first read image and the positional information regarding the output area with respect to the extensive area; and
    identifying a position of the extensive area in a second read image in a format identical to a format of the first read image on a basis of the positional information regarding the extensive area stored by the memory and extracting the output area in the second read image on a basis of the position of the extensive area and the positional information regarding the output area stored by the memory.

* * * * *